June 18, 1968     R. J. ROBERTS ET AL     3,389,208
CONSUMABLE ELECTRODE FURNACE FOR ELECTROSLAG REFINING
Filed May 4, 1967
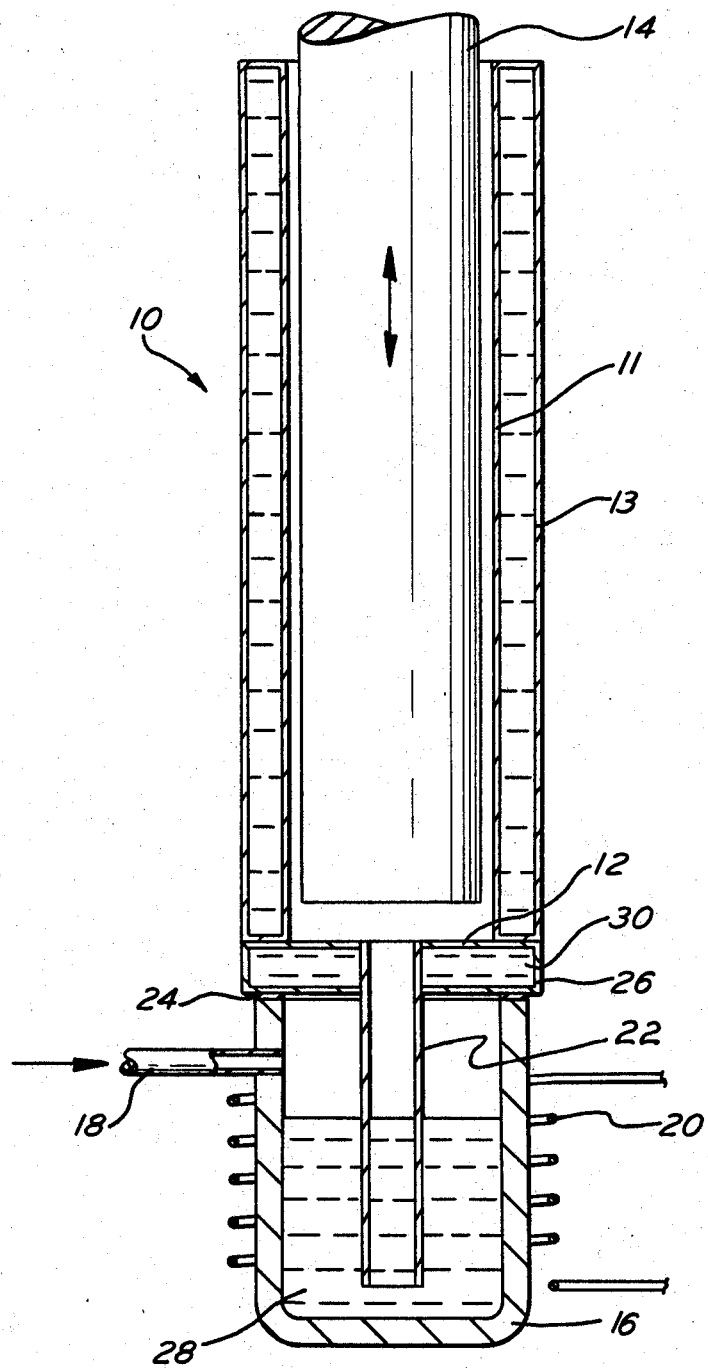
INVENTOR
RAYMOND JOHN ROBERTS
GEOFFREY HOYLE
BY
ATTORNEYS

United States Patent Office 3,389,208
Patented June 18, 1968

3,389,208
CONSUMABLE ELECTRODE FURNACE FOR ELECTROSLAG REFINING
Raymond John Roberts, Moorestown, N.J., and Geoffrey Hoyle, Sheffield, England, assignors to Consarc Corporation, Rancocas, N.J., a corporation of New Jersey
Filed May 4, 1967, Ser. No. 636,117
5 Claims. (Cl. 13—9)

ABSTRACT OF THE DISCLOSURE

A consumable electrode furnace provided with a separate receptacle for molten slag and further provided with structure for introducing molten slag into the refining zone of the furnace. Slag is forced into the refining zone by the application of gas pressure into a vessel provided with a dip-tube communicating with the refining zone of the furnace.

---

This invention relates to a consumable electrode furnace used in the electroslag process of refining metals.

Briefly, the electroslag process is performed by fusing off a consumable electrode of the metal to be refined under a blanket of molten slag. This has generally been accomplished by suspending a consumable electrode within a mold. Molten slag is introduced into the mold to provide a path for the current passing between the consumable electrode and the base of the mold. As current passes through the electrode and the molten slag, the consumable electrode is heated and droplets fuse off the end of the electrode and then pass through the slag to be collected in the bottom of the mold. Passage of molten metal through the molten slag produces the refining action characteristic of electroslag process. A pool of molten refined metal forms in the bottom of the mold. The electrode is progressively consumed and a pool of molten, refined metal builds up in the bottom of the mold to form an ingot. The molten slag floats on the pool of refined metal and remains in contact with the end of the consumable electrode. As more and more of the electrode is consumed the metal at the base of the mold is solidified while the refining process is continuing between the consumable electrode, molten slag, and pool of molten metal in an area adjacent to the end of the consumable electrode.

The slags used in the electroslag refining process are electrical insulators when they are in a solid form, and only become electrical conductors when they are in the molten form. This means that when the process is started, a pool of molten slag must be obtained between the mold and the end of the electrode before the normal electrical resistance heating process can begin.

To obtain the initial molten slag pool, various methods have been employed. The slag has been melted initially in the mold itself by means of an arc struck between the end of the electrode and the base plate, or by means of an exothermic mixture sandwiched between the end of the electrode and the baseplate and ignited by passage of an electric current. The disadvantage of both these methods is that a substantial period of time is required to establish the normal operating molten slag quantity at the normal process temperatures. During this time, part of the electrode is melted off, but the abnormal conditions have a severe deleterious effect on the quality of the first portion of the ingot thus produced.

Alternatively, the slag has been melted separately in a furnace and poured into the mold from the top. This method is disadvantageous because of the difficulty in introducing the molten slag into the narrow space which normally exists between the mold walls and the consumable electrode. Any slag which contacts the cold electrode or mold wall will solidify almost immediately and can play no useful part in starting the process. This problem may be so severe as to necessitate removal of the electrode and cleaning of the mold before the furnace is usable for refining. A further problem which arises with this method is that the slag may experience excessive cooling as it falls down into the mold, so that even if it does not contact the electrode or the mold wall, it may solidify immediately on contact with the crucible base. This problem is particularly severe when deep molds are used to produce long ingots.

It is therefore an object of this invention to provide a consumable electrode furnace which can easily and conveniently be started up by the introduction of molten slag directly into the refining zone defined by the consumable electrode and the mold.

It is a further object of this invention to provide a novel means for controllably introducing molten slag into the refining zone of a consumable electrode furnace for effecting the desired degree of metal purification during the refining process.

It is a further object of this invention to provide a novel means for introducing molten slag into the refining zone of a consumable electrode furnace which is provided with additional means for preventing the degradation of the purity of the cast ingot, particularly in the region adjacent the base or bottom of the mold.

The above and further objects and advantages achieved, according to this invention, have been obtained by providing a consumable electrode furnace with means for introducing molten slag directly into the furnace mold. As will become more apparent hereinafter, the molten slag is forced by gas pressure into the mold, preferably directly into the refining zone or a portion of the mold directly beneath the electrode.

For the purpose of illustrating the invention there is shown in the drawing a form which is presently preferred; it being understood, however, that this invention is not limited to the precise arrangements and instrumentalities shown.

The drawing is an elevation view of the consumable electrode furnace of the present invention with portions in section.

Referring now to the drawing in detail, wherein like numerals indicate like elements, there is shown in the drawing a consumable electrode furance designated generally as 10.

A mold 11 is positioned on a base plate 12 so as to receive a consumable electrode 14. The consumable electrode 14 can be lowered into the mold 11 by suitable lifting and lowering means (not shown). The exterior surface of the mold 11 may be cooled by means of a spray of an appropriate coolant or preferably by means of an enclosed cooling jacket 13 equipped with a coolant intake and exhaust (not shown). Both the mold 11 and the base plate 12 are preferably made of an electrically-conductive material such as copper or copper alloy. Located beneath the base plate 12 and generally aligned vertically with mold 11 is a slag vessel or receptacle 16. The interior of the slag vessel 16 communicates with the interior of mold 11 by means of a conduit 22 passing through base plate 12. Slag vessel 16 is further provided with a gas seal 24 for providing gas-tight contact between slag vessel 16 and base plate 12. The slag vessel 16 is provided with a gas inlet 18 which is connected to a supply of gas under pressure such as a compressed air supply or pressurized inert gas, as desired. The source of gas is a matter of choice and is therefore not illustrated in the drawing. In the embodiment illustrated, the base plate 12 is provided with an internal channel designated as cooling jacket 26. This cooling jacket may be provided with intake and exhaust means (not shown) for containing an appropriate coolant 30 for cooling that portion of conduit 22 which is surrounded by the cooling jacket 26. The functioning and purpose of the cooling jacket 26 will become more apparent from the discussion contained hereinafter of the operation of the consumable electrode furnace 10.

In operation, the slag is rendered molten in a slag vessel by means of a suitable heater 20 in contact with vessel 16. The exact nature of such heating means is not critical in the practice of this invention and any heater capable of rendering the slag molten may be suitable for the purpose. For example, a high-frequency induction furnace with a suitable susceptor may be used or an arc furnace or a resistance furnace, where desired. Heater 20 used for purposes of illustration may be considered to be an induction type heater.

In operation, the slag 28 is melted in the slag vessel 16 by means of the heater 20 and the consumable electrode 14 is positioned in the mold 11 a predetermined distance above the base plate 12. At this point, the base plate 12 and consumable electrode 14 are connected by means, not shown, to an appropriate source of electrical energy for electroslag refining. Gas pressure is then applied to the slag vessel 16 through the gas inlet 18 to provide a source of pressure on the surface of the molten slag 28. The molten slag is thereby forced to rise through the conduit 22 and enter the refining zone defined by the walls of mold 11 and the consumable electrode 14. As soon as the molten slag bridges the gap between the consumable electrode 14 and the base plate 12, current is caused to flow between the electrode and the mold. This commences the refining process by permitting the consumable electrode 14 to be heated to its melting point at the area of contact with the slag and the molten metal then drops through the slag to the bottom of the mold 11 and collects in a pool in the area defined by mold 11 and base plate 12.

After the start-up or initiation of the electroslag process in the manner described, the slag remaining in the conduit 22 can be solidified by means of circulating coolant 30 contained in cooling jacket 26. Once the slag has hardened to form a plug in conduit 22, a seal is formed preventing further flow of molten slag into or out of the refining zone and the gas pressure may be released. Control of the gas pressure at gas inlet 18 and the flow of coolant 30 in cooling jacket 26 thereby provides for the introduction of a measured amount of slag into the refining zone. Likewise, the formation of a slag plug in conduit 22 prevents contamination of the pool of refined metal which collects on the base plate 12. As the refining process continues the circulation of coolant 30 in cooling jacket 26 promotes the solidification of the refined metal in the bottom of mold 11. The refined metal is solidified at a rate comparable to the rate of consumption of consumable electrode 14. In this manner, only a small amount of liquid refined metal is present at any time in the refining process. This contributes greatly to the maintenance of high purity in the process.

The apparatus, as previously described, is preferably constructed so that the melting of the slag may be carried out with the conduit 22 clear of the slag. This may be achieved by arranging for the slag vessel 16 to be lowered while the melting is taking place and then raised into the position shown in the drawing where it is desired to transfer the molten slag to the mold 11. Alternatively, the mold 11, together with base plate 12 and conduit 22 may be raised while melting is taking place, and then lowered to effect the transfer of the molten slag. In either of these two cases, the conduit 22 must be immersed in the molten slag for the transfer of the slag to the refining zone. The length of conduit 22 will, of course, depend upon the degree of immersion necessary in order to transfer an effective amount of the slag into the refining zone by the application of gas pressure.

It is, of course, possible to arrange the components of the structure such that the conduit 22 instead of being sealed to the base plate 12 can be sealed in a gas-tight manner into a top provided for the slag vessel 16 so that the desired gas pressure can be built up completely within the slag vessel. If such an arrangement is selected, it would be desirable, for the conduit 22 to be received through the base plate 12 in such a manner that the molten refined metal could not seek an exit from the refining zone between the conduit 22 and the base plate 12, before the metal had solidified due to the cooling action of coolant 30 within cooling jacket 26.

The present invention may be embodied in other specific forms without departing from the spirit or essential attributes thereof and, accordingly, reference should be made to the appended claims, rather than to the foregoing specification as indicating the scope of the invention.

We claim:

1. A consumable electrode furnace for use in electroslag refining comprising a consumable electrode receiving means, said consumable electrode receiving means being suitable for receiving an electrode for consumption in an electroslag refining process; wherein, said furnace has mounted therein a slag vessel comprising a receptacle for containing molten slag, heating means adapted for melting slag placed in the receptacle, and molten slag transferring means including a conduit communicating with the interior of said slag vessel and the interior of said receiving means in the zone between the end of the electrode and the base of the receiving means, whereby, in response to said slag transferring means, molten slag from the receptacle is introduced into the interior of said receiving means in sufficient quantities to start the electroslag refining process.

2. The consumable electrode furnace of claim 1 wherein said slag transferring means comprises a source of gas pressure, and said slag furnace is adapted to retain a gas pressure applied from said source of gas pressure, except through the movement of molten slag through said conduit into the interior of said receiving means.

3. The consumable electrode furnace of claim 2 wherein said conduit is provided with cooling means whereby said molten slag may be solidified within the conduit to form a plug in said conduit thereby preventing further transfer of molten slag into said receiving means, and also thereby preventing transfer of molten slag or molten metal out of said receiving means when said gas pressure is subsequently released or reduced.

4. A consumable electrode furnace comprising a refining zone defined by a consumable electrode and consumable electrode receiving means, a slag transferring means comprising a gas-tight slag vessel containing molten slag, a source of gas pressure communicating with the slag vessel and a conduit, wherein said conduit is disposed generally vertically and extends downwardly into the slag vessel ending below the level of the molten slag and upwardly to communicate with said refining zone whereby the application of gas pressure to the slag vessel transfers molten slag from the slag vessel through the conduit and into the refining zone.

5. The consumable electrode furnace of claim 4 wherein said slag transferring means further comprises cooling means located in heat exchanging relationship with said conduit, said cooling means having the capacity to solidify the slag contained in at least a portion of the conduit when the slag in the conduit and the slag vessel is molten and being subjected to gas pressure, to thereby stop the flow of molten slag into the refining zone, and also thereby preventing transfer of molten slag or molten metal out of said receiving means when said gas pressure is subsequently released or reduced.

References Cited
UNITED STATES PATENTS

| | | | |
|---|---|---|---|
| 1,652,409 | 12/1927 | Moulthrop | 222—146 |
| 2,904,664 | 9/1959 | Rothacker | 219—10.51 X |
| 2,937,789 | 5/1960 | Tama | 13—31 X |
| 3,046,320 | 7/1962 | Gassen | 13—31 |
| 3,210,455 | 10/1965 | Sedlatschek | 219—10.51 X |

BERNARD A. GILHEANY, *Primary Examiner.*

H. B. GILSON, *Assistant Examiner.*